United States Patent [19]

Zaromb

[11] 4,305,999
[45] * Dec. 15, 1981

[54] ELECTROCHEMICAL POWER GENERATION

[76] Inventor: Solomon Zaromb, 171 Clifton Ave., Newark, N.J. 07104

[*] Notice: The portion of the term of this patent subsequent to Dec. 15, 1996, has been disclaimed.

[21] Appl. No.: 704,452

[22] Filed: Jul. 12, 1976

Related U.S. Application Data

[63] Continuation of Ser. No. 434,910, Jan. 21, 1974, Pat. No. 3,969,144, which is a continuation-in-part of Ser. No. 101,284, Dec. 24, 1970, Pat. No. 3,788,899, which is a continuation-in-part of Ser. No. 633,348, Apr. 12, 1967, Pat. No. 3,554,816, which is a continuation of Ser. No. 354,084, Mar. 23, 1964, abandoned, and Ser. No. 656,595, Jul. 27, 1967, Pat. No. 3,513,031.

[51] Int. Cl.$^2$ .............................................. H01M 8/04
[52] U.S. Cl. ..................................... 429/14; 429/26
[58] Field of Search ........................ 429/12, 13, 14, 26

[56] References Cited

U.S. PATENT DOCUMENTS

| | | | |
|---|---|---|---|
| 3,274,029 | 9/1966 | Lurie et al. | 429/14 |
| 3,391,027 | 7/1968 | Porter | 429/13 |
| 3,788,899 | 1/1974 | Zaromb | 429/26 |
| 3,922,177 | 11/1975 | Grappel et al. | 429/13 |

Primary Examiner—Howard S. Williams
Assistant Examiner—H. A. Feeley
Attorney, Agent, or Firm—Siegmar Silber

[57] ABSTRACT

An electrochemical power generation apparatus and methods of control thereof are described. The power source comprises one or more electrochemical cells having an anode and an oxygen or hydrogen peroxide depolarized cathode, a liquid electrolyte solution, electrolyte circulation means and an electrolyte container. The methods include varying the volumes of electrolyte in said container and in said battery cell so as to control the polarization and hence the cell output voltage of said anode and cathode. The anode is of the consumable-metal type, particularly aluminum. The method of varying the volume may be effected by expanding or collapsing a reversibly expansible pocket in said electrolyte container or by varying the rate of circulation of said electrolyte solution through said battery cell. Heat exchange apparatus may be included comprising a vacuum distillation means whereby impure ambient water or water trapped in the battery reaction product is converted into distilled water, preferably by utilizing the heat generated in said power source, said distilled water being in turn used to replenish the battery electrolyte and thereby increase the energy density of the battery.

5 Claims, 8 Drawing Figures

ELECTROCHEMICAL POWER GENERATION

This is a continuation of my co-pending application Ser. No. 434,910, filed Jan. 21, 1974, now U.S. Pat. No. 3,969,144; which in turn was a continuation-in-part of my co-pending application Ser. No. 101,284, filed Dec. 24, 1970, now U.S. Pat. No. 3,788,899; which in turn was a continuation-in-part of application Ser. No. 633,348, filed Apr. 12, 1967, now U.S. Pat. No. 3,554,816; and which in turn was a continuation of applications Ser. No. 354,084, filed Mar. 23, 1964, now abandoned, and Ser. No. 656,595, filed July 27, 1967, now U.S. Pat. No. 3,513,031. In said co-pending application, I have disclosed apparatus and methods for operation of metal-air batteries.

This invention relates to methods and apparatus for controlling power generation by electrochemical battery cells, especially those utilizing consumable metals such as zinc, magnesium, and aluminum.

This invention provides methods for controlling power generation that improve the electrical characteristics and performance of such batteries and related fuel cells. Also some of these methods and apparatus greatly increase the overall energy-to-weight ratio of the above-mentioned metal-air batteries.

Briefly, my invention consists of a metal-air battery assembly, wherein consumable metal anodes are electrochemically oxidized to a metal hydroxide thereby providing electrical energy, the rate of this process being automatically regulated by electrical circuitry or a servo-mechanism which adjusts the electrolyte level and the electrolyte temperature within said battery assembly. The heat generated within the battery electrolyte, and the heat removed from said electrolyte may be used to generate pure water by a vacuum-distillation process, thereby drastically reducing the overall weight requirements of the power source.

The present invention provides a method for controlling power generation from an electrochemical battery formed from one or more cells having a consumable-metal anode, an oxygen- or hydrogen peroxide-depolarized cathode, a liquid electrolyte solution and circulation means for said electrolyte. The control of power generation is accomplished upon introducing the electrolyte solution into the cell; adjusting the level of the electrolyte solution in said cell to achieve a desired initial battery output; maintaining the temperature of the electrolyte solution below a maximum preset value; and maintaining the desired battery performance by continual adjustments of said electrolyte level.

By "desired battery performance" I mean operation near maximum practical overall energy efficiency under given load requirements and ambient conditions, wherein practical efficiency is the product of voltage output and coulombic efficiency (CE) with respect to consumable-metal (aluminum, magnesium or zinc) anode usage. For aluminum, in the absence of corrosion, coulombic efficiency approaches 100% with the deviation therefrom primarily attributable to residual metal at end of anode life. This latter non-corrosion-related deviation from CE of 100% is controllable by sophisticated anode design, namely, providing a correct geometric configuration which can be easily obtained by persons skilled in the art.

I have discovered that different aluminum-containing electrochemical cells at given temperatures have characteristic corrosion-inhibiting polarizations such that when a cell voltage falls below a certain value, the corrosion of the aluminum becomes negligible. Thus by maintaining the electrolyte of a given cell within a narrow temperature range and similarly keeping cell voltage output below said certain value, corrosion can be substantially prevented. On the other hand, for maximum efficiency, the voltage output level should be as high as possible. Therefore for each cell at a given temperature there is an optimum voltage that results in maximum energy conversion efficiency. To maintain said optimum voltage under varying load conditions, I have developed various methods for controlling the electrolyte level within each cell compartment in proportion to the external load requirements.

The factors affecting the value of the optimum are the ohmic resistance losses in the electrolyte gap and the polarization characteristics of the cathodes. In the best mode of the invention described as the primary embodiment herein, a platinized, teflon-impregnated cathode is employed with an aqueous electrolyte solution containing 20 to 30 percent potassium hydroxide and an aluminum anode which yields an optimum cell voltage of about 1.2 volts. I have found that maintaining the cell output voltage slightly below 1.2 volt while circulating electrolyte having a temperature in the 25° to 35° C. range results in negligible corrosion.

My invention is best explained with reference to the drawings in which.

Figure 1:
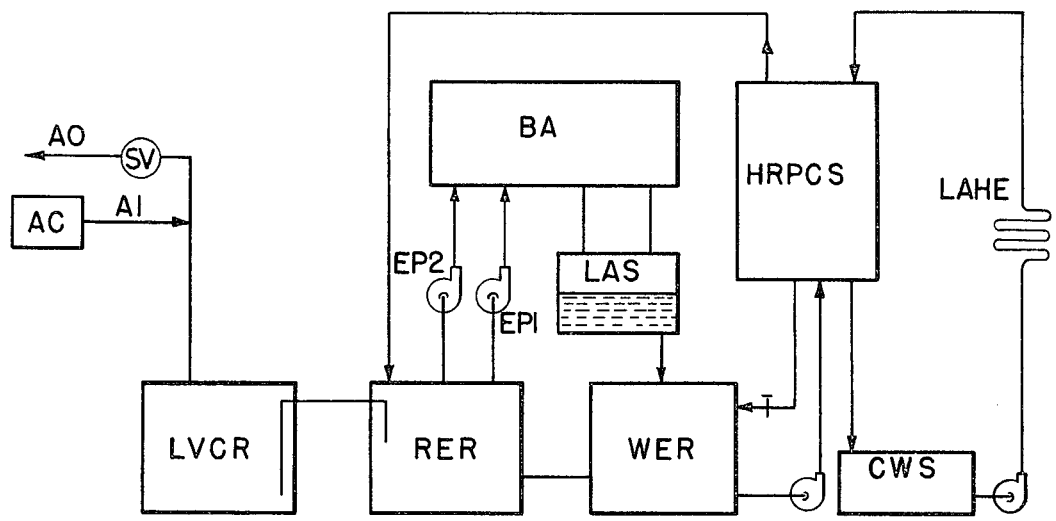
FIG. 1 is a block diagram showing the major components in one embodiment of my invention.

In FIG. 1 are shown the major components of a metal-air power source. A battery assembly BA has a number of electrochemical cells with each cell having a consumable metal anode CMA, FIG. 2, e.g., a zinc, magnesium, or aluminum anode, between two oxygen- or air-depolarized porous cathodes PC, the anodes and cathodes being separated by electrolyte gaps EG, and plastic separators PS providing electrical insulation between the cathodes of adjacent series-connected cells.

The embodiment shown schematically in FIG. 1 is a feedback mechanism which includes an air compressor AC, as a solenoid-operated control valve SV, an air outlet AO and air inlet AI. This arrangement dictates the electrolyte level at level control reservoir LVCR by determining the air, a non-electrolyte fluid, within the headspace of the chamber. The reservoirs LVCR, RER, and WER are interconnected so that upon substantial evacuation of any one, flow therebetween ensues. The manner in which this level control is conditioned by a feedback circuit dependent upon battery output voltage is described in more detail below.

The electrolyte in level control and reconditioned electrolyte reservoirs LVCR and RER, respectively, is moved by electrolyte pumps EP1, EP2 to battery assembly BA into the aforementioned electrolyte gaps EG for utilization in the electrochemical oxidation of the consumable metal anodes CMA. The resultant oxidation products, e.g. $Al(OH)_3$, $Mg(OH)_2$ or $Zn(OH)_2$, and the heat of reaction are removed by apparatus within the functional block HRPCS (heat removal and precipitate collection system) of FIG. 3. The precipitate and heat of reaction are transferred to HRPCS by the electrolyte which is removed or drained from BA through warm electrolyte reservoir WER and then pumped to HRPCS. The battery assembly BA is substantially electrically isolated from WER by liquid/air separator LAS.

The heat of the electrochemical reaction may be used in two ways to form water vapor for later condensation to distilled water which in turn may be used as make-up water for the electrolyte. The extraction of water vapr from the precipitate is described below; however, water vapor may also be formed from cooling water, especially in marine engine applications in which an abundant supply of impure cooling water is available.

Figure 3:
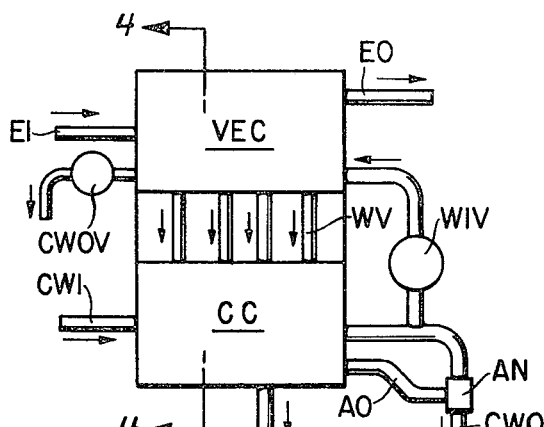
FIG. 3 is a diagrammatic representation of a water vaporization/condensation unit WVC.
Figure 4:
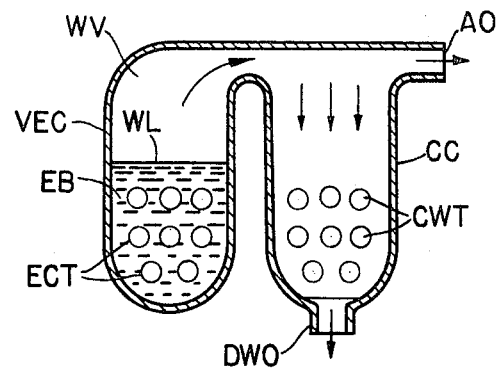
FIG. 4 is a diagrammatic view of section 4—4 of FIG. 3.

In the latter applications, the apparatus HRPCS of FIG. 1 may include the components shown in the diagrams of FIGS. 3 and 4, in particular a vacuum evaporation chamber VEC interconnected with a condensation chamber CC. An aspirator nozzle AN at the cooling water outlet CWO removes air and other non-condensable gases from both chambers through an air outlet AO, and generates a vacuum such that the pressure in each chamber approaches the vapor pressure of the water exiting through CWO. Part of the cooling water leaving CC may be allowed to enter VEC through the water inlet valve WIV until the water WL in VEC is above the electrolyte cooling tubes ECT, as indicated in FIG. 4. The warm electrolyte from the pump EP enters into tubes ECT via an electrolyte inlet EI, and the cooled electrolyte exits through the electrolyte outlet EO into the electrolyte container EC. The heat passed through ECT causes vacuum evaporation of water from the evaporating brine EB adjacent to ECT, and the water vapor WV escaping into CC carries away its heat of vaporization from VEC and hence from ECT. Condensation of WV at the cooling water tubes CWT results from the transfer of heat of vaporization from WV to the cooling water. The condensed water dripping down from the surfaces of CWT is then collected at the bottom of CC and withdrawn through a distilled water outlet DWO.

As WL drops below the uppermost tubes ECT, additional water is allowed to enter VEC thrugh WIV. To prevent the impurities in EB from reaching an excessive concentration, the brine formed in VEC may be occasionally flushed out through a cooling water outlet valve CWOV. The valves WIV and CWOV may be automatically actuated by signals from a liquid level sensor and/or a liquid density (or liquid conductivity) sensor.

Figure 5:
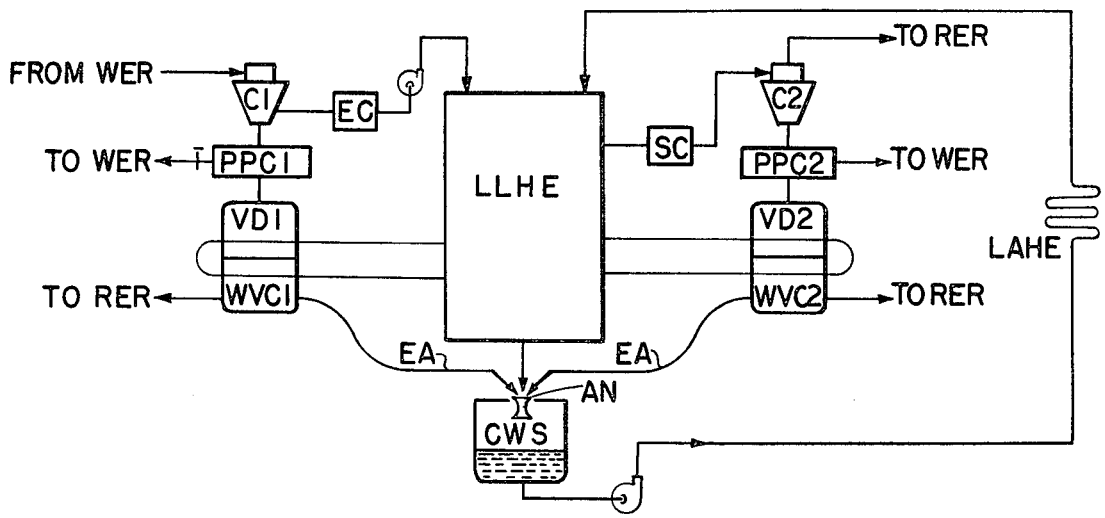
FIG. 5 is a further detailed block diagram of block HRPCS of FIG. 1 in one embodiment of my invention.

The main functional interrelationships among the structural components of the HRPCS are schematically represented by the flow diagram of FIG. 5. With the consumable-metal anodes comprised of aluminum, and the battery operating at full power, the electrolyte leaving the cell is first passed through the warm electrolyte reservoir WER and then through the first cyclone C1 which removes most of the $Al(OH)_3$ particulates from the electrolyte. The resultant clear liquid is collected in electrolyte chamber EC, and then forced by the associated pump through the liquid/liquid heat exchanger LLHE. A cooling water supply CWS, associated pump, and liquid/air heat exchanger LAHE (optional) maintain the flow of cooling water through LLHE. To prevent fouling of heat transfer surfaces in heat exchanger LLHE the cooling water is preferably prefiltered.

The embodiment of my invention described herein above is applicable to electrochemical power generation for marine and land-based applications. In this specification, however, the equipment required for utilization of water vapor from cooling medium is directed toward marine applications in which there is a large quantity of impure water at hand; and conversely the equipment required for utilization of water vapor from precipitated metal hydroxides is directed primarily toward land-based applications. In either instance, the water vapor is condensed and the distilled water produced thereby is added to the electrolyte solution as make-up water.

In land-based applications, the $Al(OH)_3$ precipitate retained by C1 is further processed through precipitate collector PPC1 for additional removal of warm electrolyte (which is returned to WER, FIG. 1). The precipitate portion from PPC1, FIG. 5 is transferred to vacuum dryer VD1. The vacuum is drawn by evacuating air EA at aspirator nozzle AN. The heat of electrochemical reaction transferred to warm coils of LLHE is used to dry the precipitate in VD1 and to produce water vapor for the land-based system described above.

At the exit end of LLHE the cooled electrolyte is forced through a seeding chamber SC containing $Al(OH)_3$ seeds. This results in the precipitation of any supersaturated $Al(OH)_3$ out of the electrolyte, thereby minimizing the degree of supersaturation in the rest of the system. The precipitate formed is again retained by a cyclone C2 and is further processed in an analogous fashion to that above, while the clear, cool electrolyte is allowed to pass back into the battery assembly BA by way of RER, FIG. 1.

Figure 8:
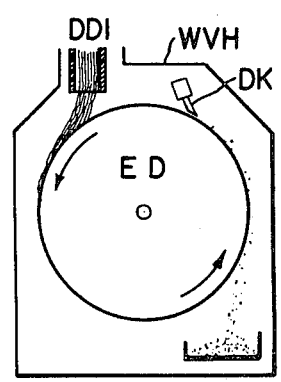
FIG. 8 is a diagrammatic representation of a drum-type vacuum dryer for use with precipitate collector PPC of FIG. 5.

In FIG. 8, a drum-type dryer is represented. The heat of the electrochemical reaction is extracted by the cooling medium and is used to heat the evaporation drum ED. The precipitate-containing slurry is fed through drum dryer inlet DDI so that it coats the aforementioned drum. The precipitate, formed of metal hydroxides, e.g. $Al(OH)_3$, $Mg(OH)_2$, is dried on and continuously scraped from the drum by doctor knives DK. The water vapor escaping from the dryer is collected by hood WVH to be condensed by a process similar to that presented by FIGS. 3 and 4.

A major advantage of aluminum-air batteries over other metal-air batteries is their high energy-to-weight ratio, even when all the required water has to be carried along with the power source. Since water is the major reactant consumed in the aluminum-air battery, and the actual weight of water required in a practical battery is known to be at least four times the weight of the aluminum consumed in the battery reaction, the oxidation of aluminum to aluminum hydroxide, the afore-described vacuum-distillation apparatus of FIGS. 3–5 renders the energy-to-weight ratio even more favorable.

This improved electrochemical power generating system may include provisions to activate the battery and to maintain its desired battery performance, especially the voltage output, under various ambient temperature conditions. To activate the battery, electrolyte may be forced into BA by manually compressing a collapsible auxiliary electrolyte reservoir (not shown). Once power is delivered by the battery, an air blower forces air through the cathodes in BA, and the electronic circuit of FIG. 6 actuates a small air compressor AC which injects air into LVCR, thereby forcing electrolyte into BA until a sufficient level is reached in BA to yield either a preset output voltage or the maximum feasible value, whichever is lower.

Figure 6:
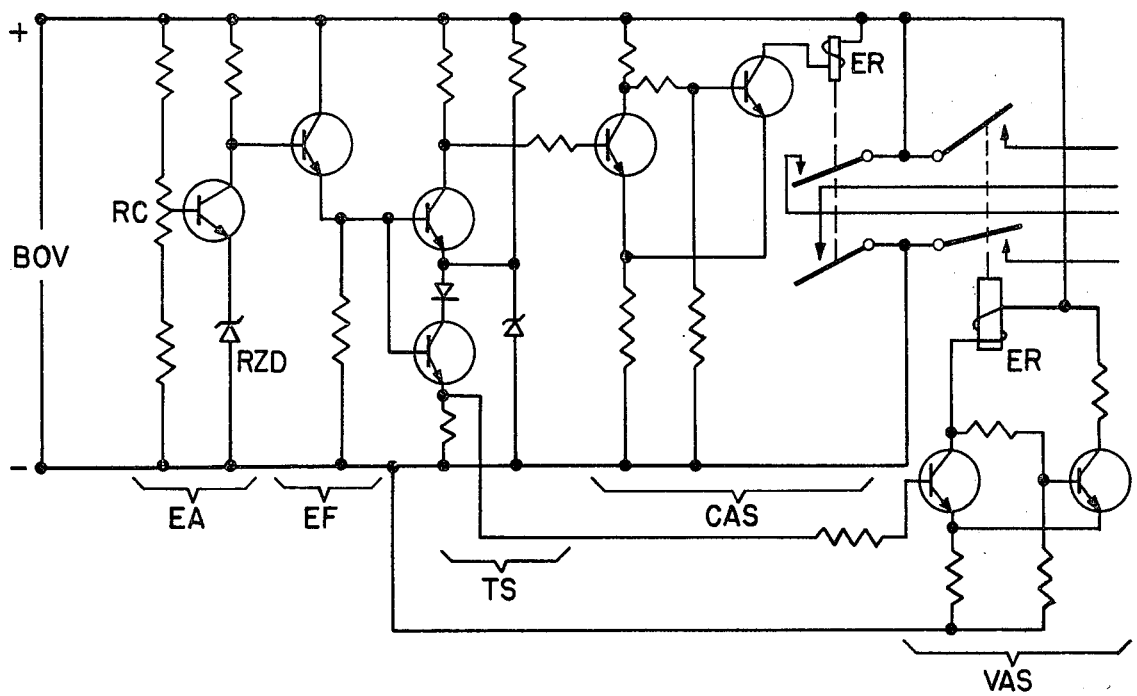
FIG. 6 is a circuit diagram of a voltage control circuit applicable to a particular embodiment of my invention.

The circuit of FIG. 6 comprises an error amplifier EA, an emitter follower EF, a threshold separator TS, a compressor actuating switch CAS, and a valve actuating switch VAS. The battery output voltage BOV is determined by a reference Zener diode RZD and an adjustable rheostat control RC which permits adjustment of the desired voltage setting. Depending on whether BOV is lower or higher than the preset voltage one of the two electrical relays ER will actuate CAS or VAS, thereby expanding or collapsing the air pocket in LVCR, which in turn results in an increase or reduction of the electrolyte volume in BA. For a given load or electrical current drain from the battery, the current density at the anodes and cathodes in each battery cell varies approximately in inverse proportion to the volume of electrolyte in BA, and the output voltage of each cell increases as the current density decreases. Hence the foregoing changes in electrolyte volume result in an increase or decrease in BOV.

The electrolyte temperature in BA is also controlled by an electrical circuit or other servo-mechanism (not shown). If the initial output voltage is lower than preset minimum value, the pumps remain inactive until the temperature reaches a maximum preset value (desirably not greater than 50° C.), as measured by a temperature sensor (not shown). Preferably, the electrolyte temperature is maintained in the 25° to 35° C. range. Once the preset temperature maximum has been reached, the pumps are actuated, and keep working until the temperature drops below a preset minimum value (about 25° C.).

Figure 7:
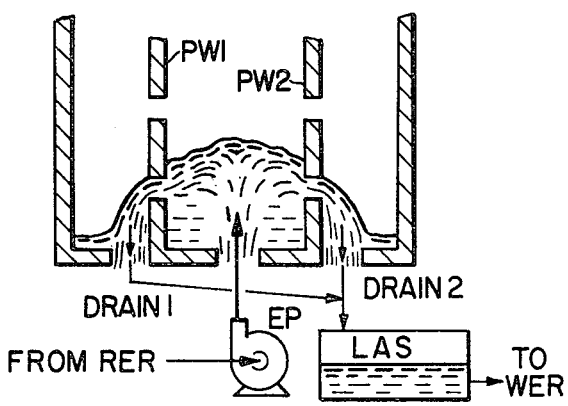
FIG. 7 is a diagrammatic representation of a dynamic-type electrolyte-level control of a second embodiment of my invention.

In FIG. 7, an alternative means of varying the electrolyte level is shown. A dynamic-type electrolyte level control is schematically represented in which there is a variable pumped inflow and outflow. The variable inflow is accomplished using a feedback control as in FIG. 6 coupled with a rheostatically controlled electrolyte pump EP, FIG. 7. For a given electrolyte level in the battery cells, the steady-state rate of drainage through perforated walls PW1 and PW2 equals the electrolyte pumping rate. When properly designed, the system is also substantially in a thermally stable state and the electrolyte flow permits necessary cooling to be maintained within the desired temperature range of 25° to 35° C. At null, the BOV is within the desired performance range (which for an aluminum-air battery is slightly below 1.2 volts), and upon variation therefrom the following correctional control is indicated. Where output voltage falls, the low-voltage relay ER of CAS, FIG. 6, is arranged to increase the pumping rate by lowering the resistance of a rheostat (not shown) which is connected in series with the pump motor. Conversely, upon excessive output voltage, the high-voltage relay ER or VAS is arranged to decrease the pumping rate by raising the resistance of the rheostat.

To one skilled in the art additional control means providing variations of the dynamic-type electrolyte level control are available. These would include means for varying drainage or inlet (bypass) openings with a fixed pumping rate.

The foregoing design features provide methods for the activation and automatic regulation of an aluminum-air battery system.

Upon battery shut-off, the pumps are stopped or else the air in LVCR is allowed to escape through the air valve SV and the electrolyte drains out of BA into LAS and hence into the reservoirs WER, RER, and LVCR.

Figure 2:
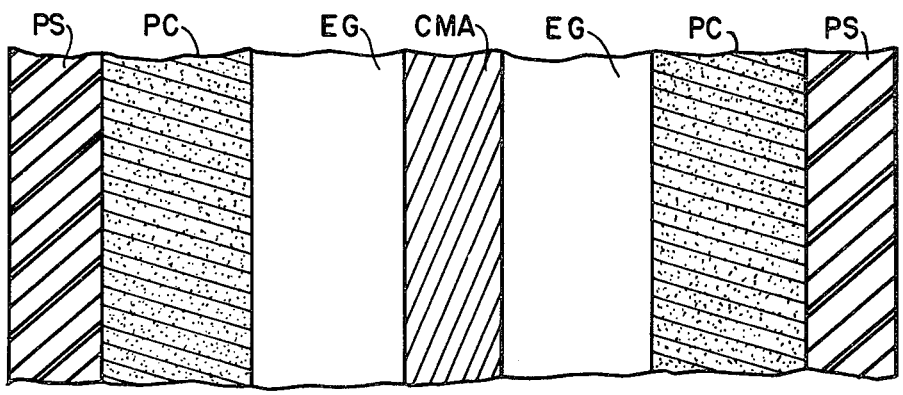
FIG. 2 is a partial diagrammatic cross-sectional view of the typical electrochemical cell of my invention.

While the aforedescribed embodiment offers special advantages for some applications, my invention obviously applies to other metal-air batteries. For instance, the consumable metal anodes could be made of magnesium or zinc in lieu of aluminum in some embodiments of my invention. Neither is this invention confined to metal-air or metal-oxygen batteries. In submarine applications, where the air supply is limited, it may be preferable to use hydrogen peroxide in lieu of oxygen as the cathode depolarizer. The porous cathodes PC of FIG. 2 are then impregnated with an $H_2O_2$-rich electrolyte solution rather than with the usual air or oxygen depolarizer, and said $H_2O_2$-rich solution could be made to circulate longitudinally through PC or between PC and PS within the battery assembly BA, and through a separate circulation and $H_2O_2$-supply system outside of BA.

I claim:

1. A method of increasing the energy density of a heat-generating water-consuming electrochemical cell producing a water-containing reaction product which comprises:
   (a) removing said reaction product from said cell;
   (b) removing the heat generated in said cell by a circulating fluid;
   (c) heating said reaction product with said circulating fluid so as to distill water therefrom;
   (d) condensing said water; and
   (e) returning the distilled water to said cell.

2. A method as claimed in claim 1 wherein said fluid also serves as the electrolyte participating in the electrochemical action of said battery.

3. A method as claimed in claim 1 wherein said distilled water is obtained through a vacuum distillation process.

4. An improved power generator including at least one electrochemical cell each cell having a consumable-metal anode, an oxygen- or hydrogen peroxide-depolarized cathode, a liquid electrolyte solution, an electrolyte reservoir, circulation means for said electrolyte, and means for removing a metal hydroxide reaction product from said cell, wherein the improvement comprises: heat exchange means for using the heat generated from said electrochemical cell to form water vapor at a pressure below ambient and for drying a wet precipitated battery reaction product; a condenser for converting said water vapor into distilled water; and electrolyte make-up means for adding said distilled water to said electrolyte.

5. An improved power generator as in claim 4 wherein said anode consists essentially of aluminum.

* * * * *